United States Patent [19]

Hanson et al.

[11] 4,420,286

[45] Dec. 13, 1983

[54] INVALID LIFT APPARATUS

[75] Inventors: James M. Hanson, Garden Grove; Robert Schlichting, Cerritos, both of Calif.

[73] Assignee: Wide One Corporation, Anaheim, Calif.

[21] Appl. No.: 248,250

[22] Filed: Mar. 27, 1981

[51] Int. Cl.³ .............................................. B60P 1/44

[52] U.S. Cl. .................................... 414/539; 414/541; 414/545; 414/921

[58] Field of Search ............... 414/921, 539, 540, 541, 414/545, 522, 549, 556, 558; 187/9 R, 24

[56] References Cited

U.S. PATENT DOCUMENTS

| | | | |
|---|---|---|---|
| 3,351,220 | 11/1967 | Kirkbride | 414/541 |
| 4,071,152 | 1/1978 | Kinkhead et al. | 414/541 |
| 4,113,121 | 9/1978 | Collins et al. | 414/545 |
| 4,121,695 | 10/1978 | Carpenter | 414/539 |
| 4,124,130 | 11/1978 | Rohrs et al. | 414/539 |
| 4,133,437 | 1/1979 | Gates | 414/921 |
| 4,353,436 | 10/1982 | Rice et al. | 414/540 |

FOREIGN PATENT DOCUMENTS

| | | | |
|---|---|---|---|
| 730970 | 6/1955 | United Kingdom | 187/24 |
| 1391099 | 4/1975 | United Kingdom | 414/522 |
| 2055344 | 3/1981 | United Kingdom | 414/921 |
| 416269 | 12/1974 | U.S.S.R. | 414/545 |

*Primary Examiner*—Bruce H. Stoner, Jr.
*Assistant Examiner*—James E. Barlow
*Attorney, Agent, or Firm*—Fulwider, Patton, Rieber, Lee and Utecht

[57] ABSTRACT

Invalid lift apparatus particularly adapted for installation in an automotive vehicle of the van type characterized by a passenger side door adjoining a loading floor. The apparatus includes a storage receptacle mountable below the loading floor to receive a platform for wheelchair passengers. The platform is extensible onto movable supports for raising and lowering relative to fixed supports attachable at opposite sides of the door opening. Limit switches are provided to control the extent of upward and downward movement of the platform, and to orient the platform in proper position for movement out of the way and onto the storage receptacle whereby ambulatory passengers can enter and leave the vehicle.

11 Claims, 13 Drawing Figures

FIG. 1
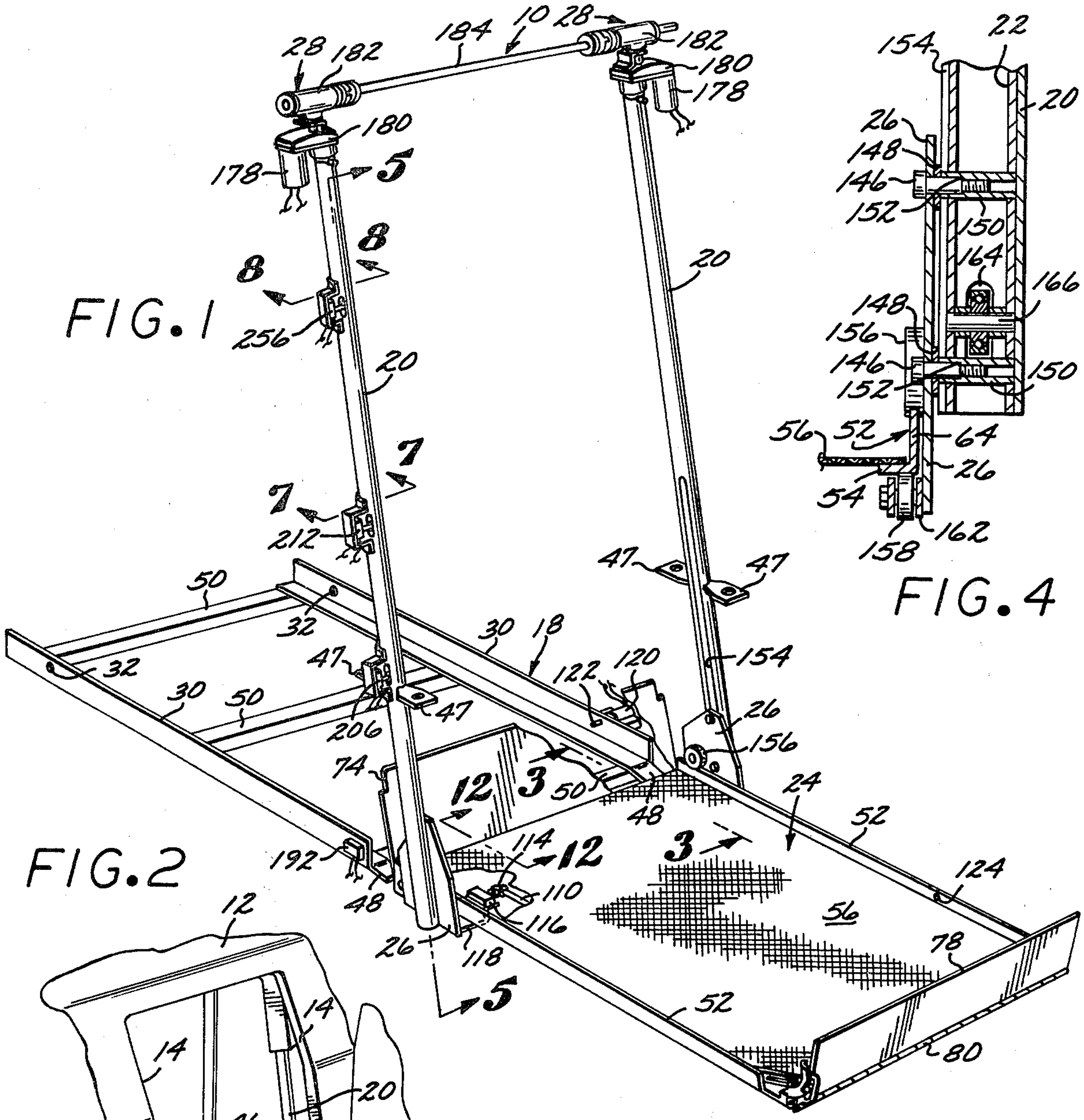
FIG. 4
FIG. 2
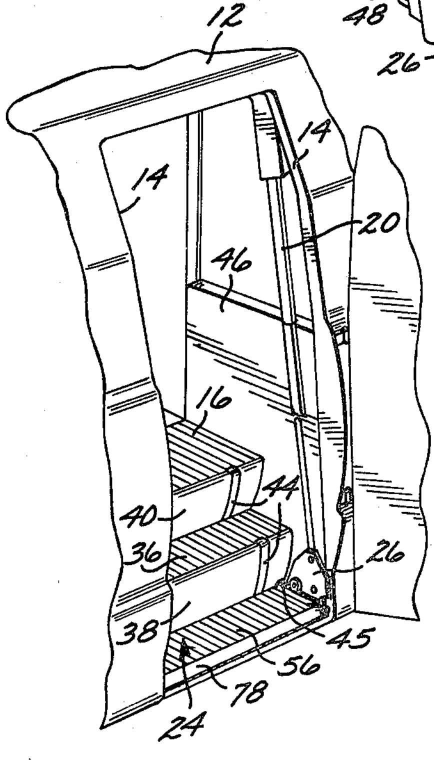
FIG. 3
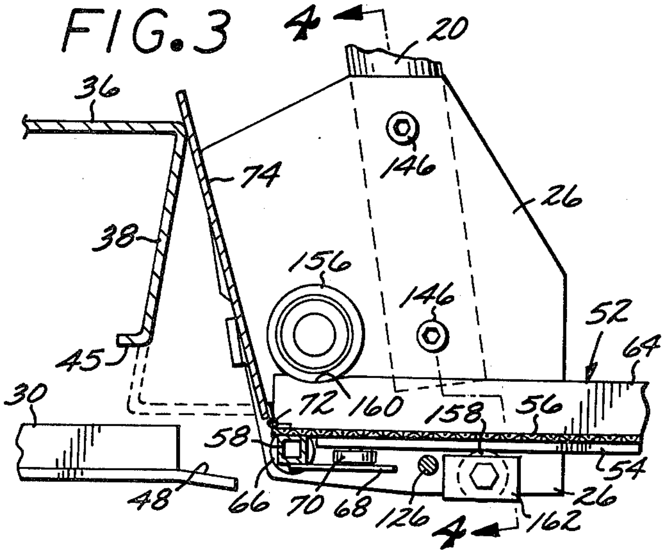

FIG.5
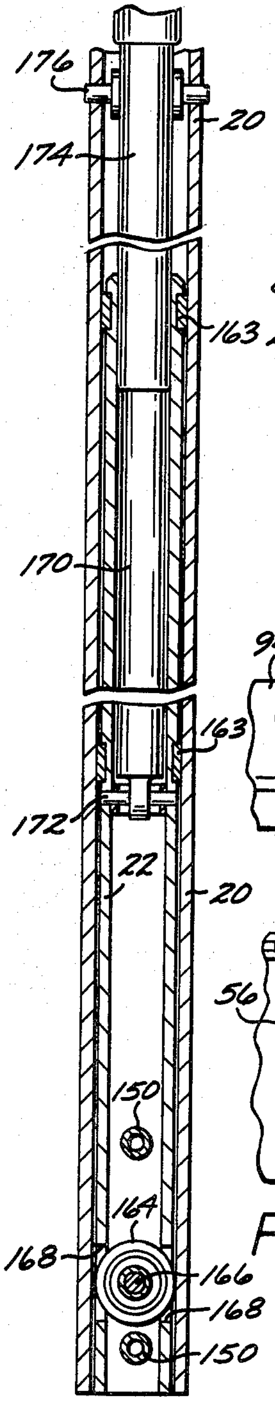
FIG.6
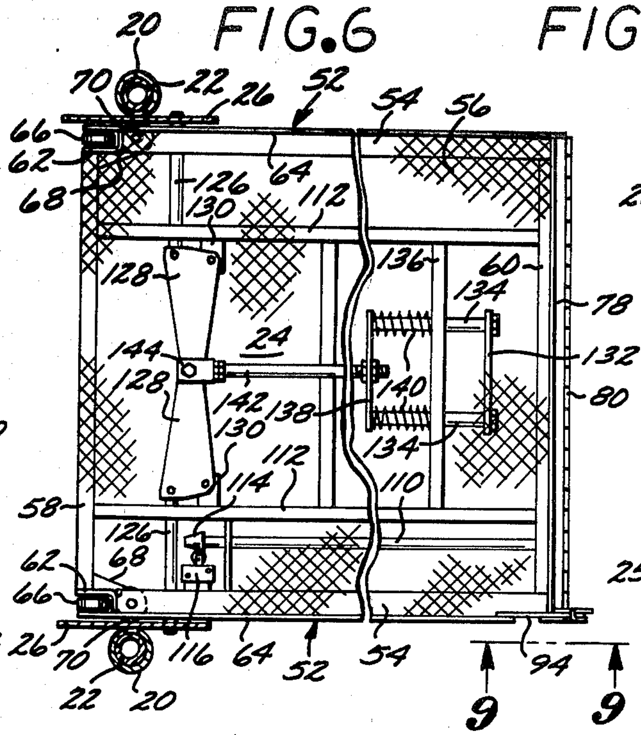
FIG.7
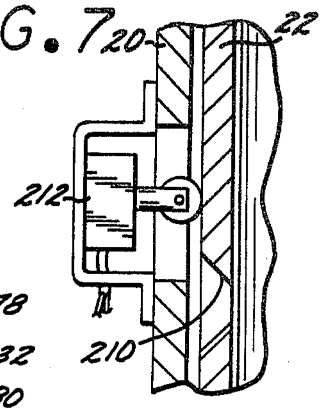
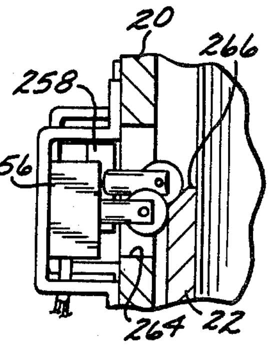
FIG.8
FIG.9
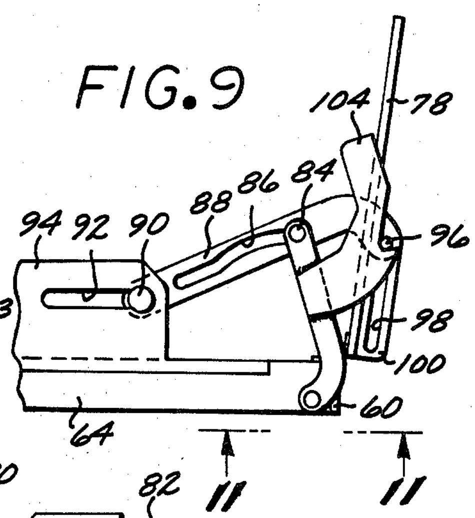
FIG.10
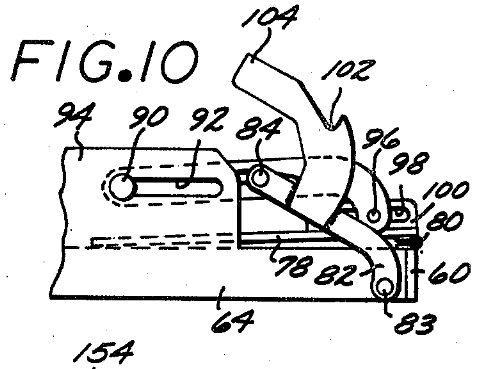
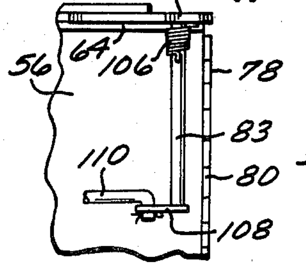
FIG.11
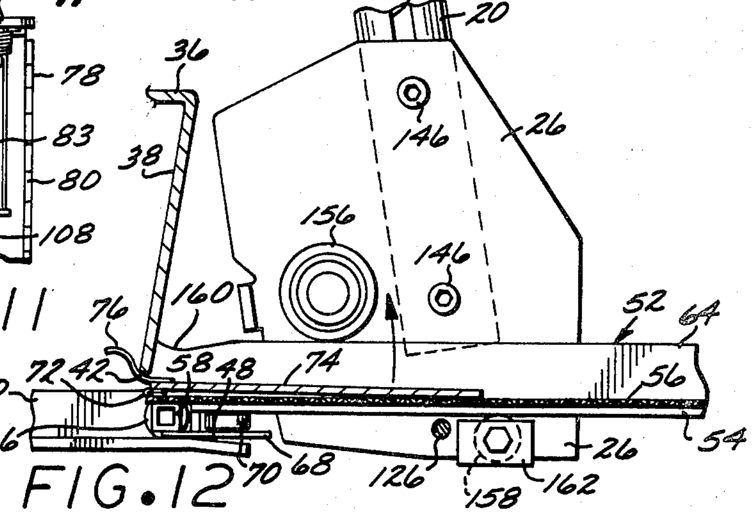
FIG.12

INVALID LIFT APPARATUS

BACKGROUND OF THE INVENTION

1. Field of the Invention

The present invention relates to invalid lift apparatus for installation adjacent a door opening adjoining a loading floor.

2. Description of the Prior Art

Invalids and handicapped persons using wheelchairs are unable to negotiate steps without difficulty and risk. This is particularly true for wheelchair passengers who must be transported in van or bus type vehicles having a loading floor reached by means of steps adjacent a side door opening.

Various types of invalid lift mechanisms have been advanced or made available which are adapted to be mounted in the vehicle door opening to raise and lower a platform carrying the wheel chair passenger. Some are not even lift mechanisms but are motorized ramps which normally block the door opening and drop down to bridge over the usual steps. Any of such mechanisms that block the loading door, whether true lift mechanisms or not, make the associated vehicle a limited purpose vehicle because the blocked door limits access to the vehicle for ambulatory passengers. In addition, many of these lift mechanisms penetrate too deeply into the interior area of the vehicle and result in cramped and poorly arranged seating for non-wheelchair passengers.

Probably the greatest single problem with prior art lift mechanisms is that they are relatively costly and complex and often require extensive and expensive modification of the vehicle, so much so that the limited financial resources of municipalities, school districts, rest and convalescent homes, charitable organizations and the like discourage more widespread use of such mechanisms.

SUMMARY OF THE INVENTION

According to the present invention, an invalid lift apparatus is provided which is particularly adapted for installation in a structure such as a bus or van type vehicle adjacent the door opening which adjoins the loading floor.

The apparatus comprises a storage receptable means which can be installed below the loading floor with a minimum of vehicle modification. There it is in position to receive and store a horizontal platform which serves as the lower one of the door opening steps when it is in its stored, recessed position. The platform is outwardly projectable for entire support upon a pair of movable supports which are vertically movably carried by a pair of fixed supports.

The fixed supports are attached at opposite sides of the door opening and, like the receptacle means, require relatively minor modifications to the vehicle. Further, they do not obstruct the door opening for ambulatory passengers.

The present apparatus includes actuators for raising and lowering the movable supports and the associated platform, and limit switch means to establish a raised platform position in which the platform is generally horizontally aligned with the loading floor, a lowered position in which the wheelchair passenger can be moved to and from ground level, and a storage position in which the platform is substantially horizontally aligned with the receptacle means and can be moved for storage below the loading floor.

The present apparatus includes a number of safety or interlock switches which prevent operation of the actuators in the event the vehicle transmission is not in a "park" mode, or a manually operable arming switch is not closed, or a safety flap mounted to the outer extremity of the loading platform is not in an "up" position, or the platform is not in its fully projected position.

Although the present lift apparatus is particularly adapted for use with automotive vehicles, it will be readily apparent that it can be used with any structure having a door opening and associated steps, and in which it is important that minimum alterations be made in the structure for its installation, and in which the door opening must be useable by ambulatory passengers when the lift apparatus is not in use.

Other objects and features of the invention will become apparent from consideration of the following description taken in connection with the accompanying drawings.

BRIEF DESCRIPTION OF THE DRAWINGS

FIG. 1 is a perspective view of the present invalid lift apparatus as would appear prior to installation in a structure;

FIG. 2 is a partial perspective view of the side of a van type of motor vehicle, paticularly illustrating the door opening and the appearance of the present lift apparatus with its loading platform recessed into its storage position;

FIG. 3 is an enlarged view taken along the line 3—3 of FIG. 1;

FIG. 4 is a view taken along the line 4—4 of FIG. 3;

FIG. 5 is a view taken along the line 5—5 of FIG. 1;

FIG. 6 is a top plan view, partially in section, illustrating the platform in its projected position;

FIG. 7 is an enlarged view taken along the line 7—7 of FIG. 1, and illustrating the location of the "up" limit switch;

FIG. 8 is a view taken along the line 8—8 of FIG. 1, and illustrating the operation of the pair of storage limit switches;

FIG. 9 is an enlarged view taken along the line 9—9 of FIG. 6, and illustrating the safety flap in its "up" position;

FIG. 10 is a view similar to FIG. 9, but illustrating the safety flap in its downward or storage position;

FIG. 11 is a detail view taken along the line 11—11 of FIG. 9;

FIG. 12 is an enlarged view taken along the line 12—12 of FIG. 1.

DESCRIPTION OF THE PREFERRED EMBODIMENT

General Arrangement

Figure 13:
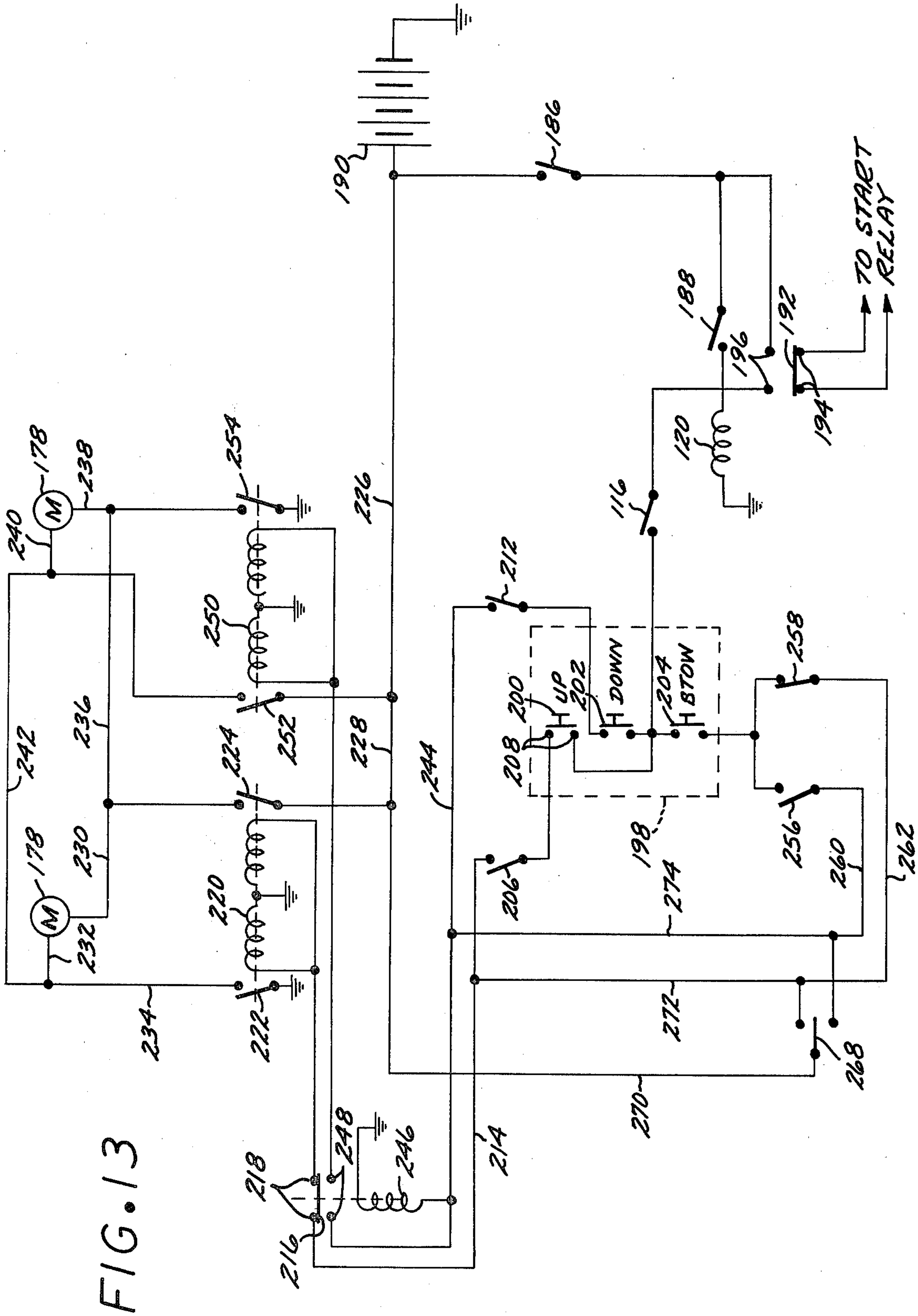
FIG. 13 is a wiring diagram of one form of operating and control circuit for the present lift apparatus.

Referring now to the drawings, and particularly to FIG. 1, there is illustrated an invalid lift apparatus 10, according to the present invention, which is particularly adapted for installation in a structrue such as a van type vehicle 12 adjacent the door sides which define the passenger loading side door opening. A loading floor 16 adjoins the door opening and is reached by means of a flight of steps.

As previously indicated, although the apparatus 10 is particularly adapted for use in conjunction with the vehicle 12, it may also be employed in association with other types of structures in which it is desirable to provide a means for raising and lowering a wheelchair passenger between a ground or lower level and a higher or floor level. Many buildings should be modified to better accommodate wheelchair passengers and the ease of installation and relatively low cost of the present apparatus will make such modifications much more likely.

In the vehicle installation to be described, the apparatus 10 comprises, generally, a storage receptacle 18 which is adapted for location within the vehicle 12 beneath its loading floor 16; a pair of elongated, generally vertically oriented fixed supports 20 adapted for attachment to the door sides 14 which define the vehicle passenger loading side door opening; a pair of elongated, generally vertically oriented movable supports 22 carried by the fixed supports 20, respectively, for vertical movement; and a generally horizontally oriented, rectangular platform 24 receivable within the storage receptacle 18 in an inward or storage position, and projectable or movable outwardly of the vehicle door opening to an outer storage position. The platform is engaged and guided between its inner and outer storage positions by a pair of support brackets 26 attached to the lower extremities of the movable supports 22, respectively, and a pair of actuators 28 coupled to the movable supports 22 are operative to effect the previously mentioned vertical movement of the movable supports 22 which, in turn, carry the platform 24 between an upper position, in which it is generally horizontally aligned with the loading floor 16, and a lowered position, in which it is close to the level of the curb, ground, street, or the like.

The vehicle 12 is typical of the many small van type or mini-bus vehicles which are used for transporting both ambulatory and wheelchair passengers over short distances, such as the transport of elderly and handicapped persons to and from medical facilities. The lift apparatus 10 is designed to quickly and inexpensively augment the passenger carrying capability of such a vehicle to suit it for such wheelchair passengers.

Conversion of a vehicle such as the vehicle 12 for wheelchair passengers is made relatively easy by reason of the comparatively few alterations that need be made to accommodate the apparatus 10, a typical completed installation being shown in FIG. 2. Since the particular attachments, fasteners, and connections to the vehicle and its wiring will vary from one vehicle to the next, and will be evident to those skilled in the art, such details are generally omitted from the disclosure which follows. Further, although the apparatus 10 is adapted for installation in various van type vehicles, it is especially suited for use with van type vehicles which have been widened or "stretched" to provide a more spacious interior. These have a larger or wider space beneath the interior or loading floor and can therefore better accommodate storage of a platform 24 of a size suitable to support standard wheelchairs.

As seen in FIG. 1, the receptacle 18 includes a pair of elongated angles constituting laterally spaced-apart rails 30 which are attached by suitable fasteners (not shown) to the vehicle structure beneath the loading floor 16, as will be apparent to those skilled in the art.

Receptacle and Associated Vehicle Structure

As seen in FIGS. 2 and 3, the vehicle door opening adjoining the loading floor 16 includes a lower step, constituted by the recessed platform 24, as will be seen, an upper step 36, and associated risers 38 and 40, respectively. The central portion of the riser 38 is cut away to form a laterally elongated riser opening 42 through which the platform 24 passes during movement between its inner and outer storage positions, and the risers 38 and 40 include metal rub rails 44 whose purpose will subsequently be described.

As best seen in FIG. 2, a notch 45 is provided in the riser 38 at each end of the opening 42 to allow inward and outward movement of the deeper side portions of the platform 24. No other significant modifications need be made in the vehicle steps and risers.

The only other major modification that needs to be made in the vehicle 12 to accommodate the apparatus 10 is the provision of appropriately molded and slotted side panels for the door sides 14, one of the panels being illustrated at 46. The lower portions of the fixed supports 20 extend through the door panels 46, while the support upper portions project above the panels 46 and serve as passenger support stanchions or hand holds. The lower support portions include mounting brackets to facilitate attachment to the frame of the vehicle, as will be apparent.

The receptacle rails 30 include horizontal legs which support the platform 24 when it rolls onto and off the receptacle 18, the outer extremities of these legs being downwardly inclined to define ramps 48 which facilitate engagement of the platform rollers with the rails 30. The rails 30 are structurally rigidified and maintained in parallel spaced-apart relation by a plurality of transverse members 50, as seen in FIG. 1.

Platform

The platform 24 includes a pair of elongated laterally spaced-apart angles 52 whose inwardly directed horizontal legs 54 fixedly support an expanded metal plate 56. Transverse tubular members 58 and 60, as best seen in FIGS. 3, 6, and 12, underlie and support the inner and outer edges of the plate 56. Opposite ends of the inner transverse member 58 are welded to brackets 62 which are fixed to the vertical legs 64 of the angles 52, respectively. The brackets 62 support vertical rollers 66 adapted to roll onto and off the ramps 48 of the receptacle rails 30.

Additional brackets 68, FIG. 6, are secured to opposite extremites of the transverse member 58 adjacent the brackets 62 to support horizontal rollers 70 adapted to engage the vertical legs of the receptacle rails 30 during movement of the platform 56 onto and off the receptacle 18. The vertical rollers 66 and horizontal rollers 70 thus always insure proper alignment and support for the inner extremity of the platform 24 during its inward and outward movement.

A transverse piano hinge 72 at the rearward extremity of the plate 56 mounts a transverse rectangular plate which constitutes an inner safety flap 74. The flap 74 pivots from a horizontal storage position overlying the platform plate 56 to an upwardly projected position when the platform moves outwardly of its storage position and beyond the step riser 38. This is accomplished by a camming element 76, as seen in FIG. 12, which is attached to the inner or lower edge of the flap 74. It is engageable with the lower edge of the step riser 38 to cause the flap 74 to pivot upwardly to the position illustrated in FIGS. 1 and 3, thereby bridging the space or gap existing between the receptacle 18 and the platform 24 in the outer storage position of the platform. This prevents injury to passengers and accidental insertion of objects into this space.

In its upwardly pivoted position, as seen in FIG. 3, the flap 74 rides upon the upper corner of the riser 38. On raising or elevation of the plaform 24, as will be seen, the upper edge of the flap 74 rides farther up and engages the rub rails 44 of the upper riser 40. The flap 74 thereafter pivots to a horizontal position overlying the loading floor 16 as the platform 24 becomes horizontally aligned with the floor 16. A reverse operation of the flap 74 occurs when the platform 24 is lowered, the flap 74 engaging the rub rails 44 and thereby always bridging the space between the platform 24 and the steps.

A corresponding outer safety flap 78 is pivotally mounted at its lower edge to the outer transverse platform member 60 by a transverse piano hinge 80, as best seen in FIGS. 1, 9 and 10. In its inwardly folded, horizontal position the flap 78 overlies the platform plate 56 and forms a portion of the lower step of the vehicle when the platform 24 is in its inner storage position, as seen in FIG. 2.

When the platform 24 is pulled outwardly to its outer storage position, the operator manually pivots the flap 78 from the horizontal position of FIG. 10 to the generally vertically oriented position of FIG. 9 to prevent wheelchair passengers from rolling off the platform 24.

The flap 78 can be latched in its upwardly pivoted position by means of a latching mechanism which comprises a platform arm 82 pivotally mounted at its lower end to a transverse shaft 83 which rotatably passes through the vertical leg of a bracket 94 welded to the end of the adjacent one of the platform rail 52, as seen in FIGS. 9–11. The opposite end of the arm 82 carries a pin 84 which is longitudinally slidable within a slot 86 provided in a second platform arm 88. One end of the arm 88 carries a pin 90 which is horizontally slidable within a slot 92 provided in the bracket 94.

The opposite end of the second platform arm 88 mounts a pin 96 which is slidable within a groove 98 provided in a flap bracket 100 welded to the underside of the outer extremity of the safety flap 78. When the flap 78 is in its upwardly pivoted, safety position, the pin 96 is receivable within a notch or detent 102 formed in an arm extension 104 welded to the mid-portion of the first platform arm 82.

As seen in a comparison of FIGS. 9 and 10, upward pivotal movement of the flap 78 is accompanied by outward slidable movement of the pins 90 and 84 in the slots 92 and 86, respectively, and by outward slidable movement of the pin 96 in the slot 98, accompanied by receipt of the pin 96 in the detente 102. This prevents the flap 78 from being pivoted outwardly by any outward pushing from the wheel of a wheelchair. However, by deliberate inward movement of the flap 78 the pin 96 can be unseated from the detent 102, when the platform 24 is to be moved to its inner storage position.

As best seen in FIGS. 6 and 11, the shaft 83 pivots against the bias of a torsion spring 106 when the safety flap 78 is pivoted toward its upward or safety position, as seen in FIG. 9.

During movement of the flap 78 to its upper or safety position, a bell crank 108 carried at the opposite end of the shaft 83 urges an elongated shaft 110 inwardly. The shaft 110 is longitudinally slidably movable beneath the platform plate 56 and at its inner end mounts a camming member 114. On inward movement the member 114 engages the roller of a safety flap interlock switch 116, as seen in FIG. 6, and closes the switch circuit. The switch 116 is carried by a bracket 118 which is secured to the adjacent support bracket 26 and which extends beneath the adjacent platform angle 52, as best seen in FIG. 1. The operation of the circuit associated with the switch 116 will be described subsequently.

The platform 24 is securely held in its inner storage position beneath the loading floor 16 by separate solenoid and latching mechanisms. The solenoid mechanism is indicated diagrammatically in FIG. 1, and comprises a solenoid 120 having a locking pin 122 normally projected inwardly through a complemental opening 124 provided in the adjacent one of the platform angles 52, as best seen in FIG. 1. As will be seen in connection with the subsequent description of the operation of the apparatus 10, energization of the solenoid 120 retracts the pin 122 and releases the platform 24 for manual withdrawal or outward projection.

As seen in FIG. 6, the platform 24 includes a pair of locking shafts 126 which object laterally through suitable openings in the longitudinal platform elements 112 an outwardly of the platform rails 52. As seen in FIGS. 1 and 6, the outer ends of the locking shafts 126 are adapted to project through complemental openings 32 in the receptacle rails 30 to lock the platform 24 in its inner storage position.

As seen in FIGS. 3 and 12, the shafts 126 project into openings in the brackets 26 to lock the platform 24 in its outer or projected position.

Withdrawal of the shafts 126 for release of the platform 24 in either position is accomplished by pivotal movement of a pair of laterally extending latch plates 128 to which shafts 126 are connected, the adjacent corners of the generally triangularly configured plates being pivotally carried by brackets 130 secured to the adjacent platform elements 112. The opposite extremities of the plates 128 are pivotally secured to the inner end of a longitudinally extending rod 142. Outward movement of the rod 142 pivots the plates 128 upon the brackets 130 and withdraws the shafts 126 from the openings in the receptacle 18 or brackets 26, as the case may be.

Outward movement of the rod 142 is accomplished by an operator placing his hand beneath the outer extremity of the platform 24 and grasping a transverse plate constituting a handle or grip 132. The opposite ends of the grip 132 are attached to a pair of longitudinally extending rods 134 longitudinally slidable through suitable openings provided in a transverse platform element 136 which is secured at its opposite ends of the longitudinal platform elements 112.

The inner ends of the rods 134 are attached to a transverse plate 138, and outward pulling of the grip 132 compresses a pair of compression springs 140 mounted upon the rods 134 between the transverse element 136 and the plate 138, developing a bias which normally tends to move the grip 132 inwardly. The plate 138 is connected to the rod 142. With the foregoing arrangement, outward movement of the grip 132 by the operator pivots the latch plates 128 and releases the shafts 126 from the openings 32.

When the platform is moved slightly, the grip 132 can be released and the ends of the shafts 126 will slide against the adjacent receptacle rails 30 for re-entry into the adjacent locking openings when the platform 24 is moved into its inner or outer storage position.

Movable Supports and Brackets

The lower extremities of the movable supports 22 are each rigidly secured to an associated bracket 26 by a pair of bolts 146. Each bolt 146 extends through an opening in the bracket 26, through a spacing washer 148, and threads into the threaded interior of a bushing 150 which is disposed through confronting openings in the opposite wall portions of the movable support 22. Each bushing 150 includes a counterbore portion against which a complemental annular shoulder of the bolt 146 rests to project the bolt head 146 and bracket 26 a predetermined distance outwardly of the associated fixed support 20. Each fixed support 20 includes a vertical slot 154, as best seen in FIG. 1, through which the bolts 146 slidably move during vertical movement of the platform 24.

As best seen in FIGS. 1, 3, 4 and 12, each bracket 26 includes a relatively large upper support roller 156 and a lower support roller 158 which engage, respectively, the upper and lower portions of the associated platform angle 52. As best seen in FIG. 3, the lower roller 158 is spaced outwardly of the upper roller 156 for better stability and firm support of the platform 24 at all times. In the outwardly projected, outer storage position of the platform 24, the upper rollers 156 rest within detents 160 provided in the upper inner edge portion of the vertical leg 64 of the associated platform angles 52.

Each upper roller 156 is rotatably carried on a shaft secured to the associated bracket 26, while the associated lower roller 158 is rotatably mounted to a stub shaft carried by a bracket 162 which is secured to the lower extremity of the bracket 26.

Referring now to FIGS. 4, 5, 7 and 8, loads borne by the movable supports 22 during their vertical movement within the fixed supports 20 are transferred to the fixed supports 20 by means of low friction slide bushings 163 and by thrust rollers 164 which are each rotatably carried by a stub shaft 166 disposed within suitable confronting openings provided at the base of the associated movable support 22 just above the lowermost one of the bracket bolts 146. As seen in FIG. 5, slots 168 are provided in the opposite walls of the movable support 22 adjacent each thrust roller 164 to permit the roller periphery to project outwardly for engagement with the inner surface of the associated fixed support 20.

Actuators

The actuators 28 may be any suitable means for effecting vertical movement of the movable supports 22 relative to the fixed supports 20. The commercially available actuator utilized in the present apparatus is a ball screw jack type in which cooperating screw portions engage interposed ball bearings to facilitate easy relative rotational movement of the screw portions, as will be apparent to those skilled in the art. One of the screw portions 170 is secured to the movable support 22 by a connecting pin 172, while the other screw portion 174 is connected to the fixed portion 20 by a pin 176.

Each actuator 28 is illustrated generally in FIG. 1 and comprises an electrically energizable reversible motor 178 operative through a gear box 180 to transmit its torque to the screw portion 170, extending or retracting the screw portion 170 relative to the screw portion 174, depending upon the polarity of energization of the motor 178. Each gear box 180 is interconnected to the other by right angle gear boxes 182 coupled to an interconnecting transverse shaft 184 so that both of the movable supports 22 are moved in unison. Further, a hand crank opening is provided in one of the gear boxes 182 so that the shaft 184 may be rotated to effect manual raising and lowering of the platform 24 in emergency situations, such as in the event of a power failure.

Each motor 178 is capable of operation at 5100 rpm under 700 pounds load, the associated gear box 180 having a gear ratio of 17:1 to effect relative movement of the screw portions 170 and 174 through a 36 inch stroke at a speed of 1 inch per second. The gear boxes 182 provide a 1:1 gear ratio.

Operation and Control System

The safety of wheelchair passengers is extremely important and the present apparatus includes a variety of fail-safe features. As seen in FIG. 13, after the driver of the vehicle 12 brings it to a stop, the gear shift lever must be placed in its "Park" position to close a park interlock switch 186. Otherwise, the apparatus 10 will not operate. Next, the driver removes the ignition key, opens the loading door, and secures the door in its fully open position.

The ignition key must next be used to close a key operated arming switch 188. This applies current from an auxiliary battery 190 to the solenoid 120, retracting the solenoid pin 122 and freeing the platform 24 for outward movement.

The operator reaches beneath the platform 24, which is in the position illustrated in FIG. 2, and pulls the grip 132 outwardly to retract the locking shafts 126.

The platform 24 is manually rolled out to its outer storage position, the upper rollers 156 rolling into the detents 160, and the locking shafts 26 engaging the locking openings in the brackets 126 to constrain the platform 24 against accidental inward or outward movement. During outward platform movement the inner safety flap 74 is pivoted upwardly from the position of FIG. 12 to that of FIG. 3, bridging the gap between the receptacle 18 and the platform 24, and preventing possible injury to presons stepping into that gap.

The driver now lifts the outer safety flap from the folded position of FIG. 10 to the position of FIG. 9. This closes the safety flap interlock switch 116. It is important to note that the platform cannot be raised or lowered until this switch 116 is closed. Likewise, the system cannot be operated until the platform is fully extended. When this occurs a roller of a storage interlock switch 192 moves an associated switch lever from a pair of contacts 194 to a pair of contacts 196. This shorts out the starting circuit of the vehicle and completes a circuit from the auxiliary battery 190 through the park interlock switch 186, through the contacts 196 and the arming switch 116, to a lift control circuit 198.

The circuit 198 includes normally open up, down, and storage switches 200, 202 and 204, respectively. Assuming the platfrom 24 is to be raised to the level of the loading floor 116 for a waiting wheelchair passenger in the vehicle, the "up" switch 200 is manually depressed. At this time the roller of an up limit switch 206 mounted to one of the fixed supports, as seen in FIG. 1, projects through a slot in the fixed support 20 and engages the surface of the movable support 22. This engagement moves the roller of the switch 206 inwardly and closes the circuit across the pair of contacts 208 illustrated in FIG. 13. As will be seen, this operates the actuators 28 to raise the platform. This continues until the roller of the up limit switch 206 drops into a slot (not shown) in the movable support 22, the slot being like a similar slot 210 which is provided for receiving the similar roller of a down limit switch 212 illustrated in FIG. 7. Although only the down limit switch 212 and the cooperating slot 210 are physically illustrated, the mounting and operation of the up limit switch 206 is substantially identical.

With the up limit switch 206 closed, current passes through a lead 214, through a switch 216 bridging a pair of contacts 218, and through a solenoid 220 to ground. Energization of the solenoid 220 closes a pair of switches 222 and 224, which completes a circuit from the battery 190 through leads 226 and 228, through the switch 224, and through a lead 230 to the motor of the right actuator 178, and then through leads 232 and 234 and the switch 222 to ground. This energizes the right motor 178. In addition, current also passes from the switch 224 through leads 236 and 238 to the motor 178 of the left actuator 28, and thence to ground through leads 240 and 242, and the lead 234 and switch 222.

The energized motors 178 operate the actuators 28 to raise the platform 24 to the level of the loading floor 16, at which time the roller of the up limit switch 206 drops into the previously described slot in the movable support 22, opening the circuit 206 and deenergizing the motors 178.

Once the wheelchair passenger is loaded onto the platform 24, the down switch 202 is manually operated and, since the roller of the down limit switch 212 is out of the slot 210, as seen in FIG. 7, the switch 212 is moved from the open position illustrated in FIG. 13 to a closed position which applies current through a lead 244 to a solenoid 246 and to ground. This moves the switch 216 from the contacts 218 to bridge a pair of contacts 248, which applies current to a solenoid 250 and then to ground.

Energization of the solenoid 250 closes a pair of switches 252 and 254, one of which carries current from the lead 226 to the motor 178 of the left actuator 28 by means of a lead 240, which circuit is completed to ground through the lead 238 and the now closed switch 254, thereby energizing the left motor 178. The other or right motor 178 is similarly energized by current passing through the leads 242 and 232, and from the right motor 178 to ground through the leads 230 and 236 and the switch 254. Such energization of the motors 178 lowers the platform 24 until the down switch 202 is manually released, or the roller of the down limit switch 212 drops into the slot 210, whichever occurs first.

When the platform 24 has reached the desired lower position, the operator pivots the outer safety flap 78 from the position of FIG. 9 in a clockwise direction until the free edge of the flap 78 rests upon the ground surface, the flap 78 thereby serving as a ramp. It is important to note that at the time the safety flap interlock switch is open, disabling the circuit to the motors 178 and preventing any raising or lowering of the platform 24.

Once the wheelchair passenger has left the platform 24, the operator lifts the flap 78 to a position which closes the interlock switch 116, readying the system for raising the platform 24.

Assuming the platform 24 is to be stored in its inner storage position, the operator presses a stow switch 204 whose purpose is to energize the motors 178 to move the platform 24 in the proper direction to precisely align it with the receptacle 18. This is caused by operation of one or the other of a normally open upper stow limit switch 256 and a normally closed lower stow limit switch 258 which are connected by leads 260 and 262 to the leads 244 and 214 connected to the down limit switch 212 and the up limit switch 206. Closure of one of the switches 256 and 258 will raise the platform 24, while closure of the other switch will lower the platform 24. As seen in FIG. 8, the switches 256 and 258 are mounted on one of the fixed supports 20, with their rollers projecting through a pair of slots 264 provided in the fixed support 20, in position to ride against the adjacent surface of the associated movable support 22.

Pressing the stow switch 204 with the platform 24 in a position below the desired outer storage position applies power through the normally closed lower stow limit switch 258, through the lead 262 to energize the motors 178 and raise the platform. When the platform 24 reaches the proper level, that is, a level corresponding to the outer storage position, the roller of the switch 258 will drop into one of a pair of side-by-side slots provided in the movable support 22, one of which is illustrated at 266 in FIG. 8. This opens the switch 258. If the platform 24 has been above the desired outer storage position, pressing the stow switch 204 would energize the motors 178 to move the platform 24 downwardly. The end margins of the pair of slots 266 are arranged such that when the platform 24 reaches its outer storage position, both switches 256 and 258 are just open, the slightest movement in either direction operating one or the other of the switches to actuate the motors 178 and exactly center the platform 24.

Once the outer storage position is reached, the operator pivots the safety flap 78 to the position of FIG. 10, and manually pushes the platform 24 inwardly into its inner storage position beneath the loading floor 16, as seen in FIG. 2.

In emergency situations where it is desired to by-pass the lift control circuit 198, the operator can manually actuate an emergency control switch 268, which applies current from the lead 228 and a lead 270, to one or the other of a pair of leads 272 and 247, depending upon whether the platform 24 is to be raised or lowered.

With the foregoing system, it is seen that the vehicle 12 must be stopped, its gear shift lever placed in park, and an arming switch 188 closed in order to energize a solenoid 120 to permit the platform 24 to be manually pulled out of the vehicle. Further, the platform 24 cannot be inadvertently withdrawn, since the operator must manually operate the latching mechanism to withdraw the latching shafts 126.

Once the platform 24 is manually pulled outwardly, the platform cannot be raised or lowered until the safety flap 78 is pivoted upwardly. Further, the apparatus 10 includes switches to prevent over travel of the platform 24 in its upward and downward movements, and a storage switch system is provided that causes the platform 24 to be precisely aligned with the receptacle 18 when it is desired to push the platform 24 into its inner storage position. Once in this position, the switch 192 bridges the contacts 194, and only then can the vehicle engine be started.

Various modifications and changes may be made with regard to the foregoing detailed description without departing from the spirit of the invention.

We claim:

1. Invalid lift apparatus in combination with a passenger vehicle having a loading floor, and a door opening adjoining said loading floor, said apparatus comprising:

storage receptacle means located below said loading floor;

a generally horizontally oriented platform receivable within and supported by said receptacle means in an inner position wherein said platform projects outwardly of said loading floor and defines a step located inwardly of said door opening for ambulatory persons to step up to and down from said loading floor, said platform being movable outwardly of said doorway, into an outer position and out of engagement with said receptacle means, for subsequent lowering into a lower position wherein a wheelchair can be rolled onto or off said platform, and wherein said platform defines a step extending outwardly of said door opening for ambulatory persons to step up to or down from said loading floor when there is no wheelchair on said platform;

a pair of elongated, generally vertically oriented fixed support means attached to said structure on opposite sides of said door opening, respectively, and extending upwardly above the top of said door opening;

a pair of movable support means carried by said fixed support means, respectively, for vertical movement relative to said fixed support means, and including a pair of support bracket means for engaging and supporting said platform in said outer position;

a pair of actuator means carried by the upper extremities of said pair of fixed support means and mechanically coupled to the upper extremities of said pair of movable support means, respectively, and each operative to develop a torque to effect said vertical movement of the associated one of said pair of movable support means for raising and lowering said platform between said lower position and an upper position level with said loading floor for transferring a wheelchair between said platform and said loading floor; and coupling means including a shaft connected to said pair of actuator means, and operative to mechanically transmit said torque developed by each of said pair of actuator means to the other of said pair of actuator means to thereby equalize the vertical movements of said pair of movable support means, said shaft extending transversely above the top of said doorway.

2. Invalid lift apparatus according to claim 1 wherein said receptacle means includes a pair of elongated, laterally spaced apart guide rails; and wherein said platform includes roller means engageable with said guide rails for guiding said platform during movement of said platform between said inner position and said outer position.

3. Invalid lift apparatus according to claim 1 wherein said platform includes a pair of elongated, laterally spaced apart support rails; and wherein said bracket means include upper rollers engaging upper portions of said support rails, and lower rollers engaging lower portions of said support rails for supporting the inner extremity of said platform in said outer position in spaced relation to said receptacle means.

4. Invalid lift apparatus according to claim 3 wherein said lower rollers are located outwardly of said inner rollers whereby a torque load is imposed upon said bracket means; and wherein said movable support means are substantially coextensive with and telescopically slidably receivable within said fixed support means and include load bearing means movably engageable upon said fixed support means for transferring said torque load to said fixed support means.

5. Invalid lift apparatus according to claim 1 wherein said platform includes a transverse outer safety flap hinged to the outer extremity of said platform, and further includes a latching mechanism operative to latch said outer safety flap in an up position thereby preventing a wheelchair from rolling off said platform.

6. Invalid lift apparatus according to claim 1 wherein said receptacle means include locking openings, and said platform includes locking shafts projectable into said locking openings in said inner position of said platform, said platform further including unlatching means located adjacent the outer extremity of said platform and manually actuable for retracting said locking shafts from said locking openings.

7. Invalid lift apparatus for installation in a structure adjacent a door opening adjoining a loading floor, said apparatus comprising:

storage receptacle means adapted for location in said structure below said loading floor;

a generally horizontally oriented platform receivable within and supported by said receptacle means in an inner position, and movable outwardly into an outer position out of engagement with said receptacle means, the outer extremity of said platform mounting a transverse safety barrier for pivotal movement between an inward, generally horizontal position and an upright barrier position;

a pair of elongated, cylindrical and generally vertically oriented fixed support means adapted for attachment to said structure on opposite sides of said door opening whereby said door opening provides an unobstructed passage for ambulatory persons;

a pair of elongated, generally vertically oriented movable support means telescopably, slidably disposed within said fixed support means, respectively, and including at their lower extremities a pair of support bracket means having roller support means for engaging and supporting said platform in said outer position;

reversible actuator motors coupled to said movable support means and operative to effect vertical movement of said movable support means for raising and lowering said platform relative to said fixed support means;

a control circuit for coupling said actuator motors to a source of power for operating said actuator motors, said control circuit including normally open safety barrier switch means operative by said safety barrier in said barrier position to close said control circuit;

normally open platform interlock switch means in said control circuit and operative by said platform upon movement of said platform to said outer position to close said control circuit; and normally open up switch means and normally open down switch means in said control circuit alternately manually operable to close said control circuit.

8. Invalid lift apparatus according to claim 7 and including normally open up limit switch means and normally open down limit switch means in said control circuit and carried by said fixed support means for alternate closure upon movement of said platform between predetermined lower and upper positions.

9. Invalid lift apparatus according to claim 7 and including storage limit switch means in said control circuit adapted to sense location of said platform above or below said outer position and manually actuable to move said platform into said outer position preparatory to manual movement of said platform into said inner position.

10. Invalid lift apparatus according to claim 7 wherein said platform includes a grip member located adjacent the outer extremity of said platform; platform interlock means adapted for locking engagement with said receptacle means in said inner position of said platform to lock said platfrom in said inner position, and for locking engagement with said bracket means in said outer position of said platform to lock said platform in said outer position; and connecting means between said grip member and said interlock means for releasing said interlock means from said locking engagements upon manual movement of said grip member whereby said platform is free to move between said inner and outer positions.

11. Invalid lift apparatus for installation in a structure adjacent a door opening adjoining a loading floor, said apparatus comprising:

storage receptacle means adapted for location in said structure below said loading floor;

a generally horizontally oriented platform receivable within and supported by said receptacle means in an inner position, and movable outwardly into an outer position out of engagement with said receptacle means, said platform including a transverse inner safety flap hinged to the inner extremity of said platform and having a camming element for engagement with said structure upon movement of said platform from said inner position to said outer position whereby said inner safety flap is adapted to pivot upwardly and bridge any space between said structure and said platform in said outer position;

a pair of elongated, generally vertically oriented fixed support means adapted for attachment to said structure on opposite sides of said door opening, respectively;

a pair of movable support means carried by said fixed support means, respectively, for vertical movement relative to said fixed support means, and including a pair of support bracket means for engaging and supporting said platform in said outer position; and actuator means coupled to said movable support means and operative to effect said vertical movement of said movable support means for raising and lowering said platform.

* * * * *

UNITED STATES PATENT AND TRADEMARK OFFICE

CERTIFICATE OF CORRECTION

PATENT NO. : 4,420,286

DATED : December 13, 1983

INVENTOR(S) : James M. Hanson and Robert Schlichting

It is certified that error appears in the above-identified patent and that said Letters Patent is hereby corrected as shown below:

Column 6, line 24, delete "object" and insert --project--;

Column 8, line 59, delete "platfrom" and insert --platform--.

Signed and Sealed this

*Eighteenth* Day of *September 1984*

[SEAL]

*Attest:*

GERALD J. MOSSINGHOFF

*Attesting Officer* *Commissioner of Patents and Trademarks*